United States Patent
Hsieh et al.

(10) Patent No.: US 8,154,865 B2
(45) Date of Patent: Apr. 10, 2012

(54) COMPUTER INCLUDING A DISK DRIVE, MOTHERBOARD AND FAN

(75) Inventors: Chung-Cheng Hsieh, Taipei Hsien (TW); Che-Yu Kuo, Taipei Hsien (TW); Chien-Fa Huang, Taipei Hsien (TW); Li-Ping Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 166 days.

(21) Appl. No.: 12/695,725

(22) Filed: Jan. 28, 2010

(65) Prior Publication Data

US 2011/0122568 A1 May 26, 2011

(30) Foreign Application Priority Data

Nov. 26, 2009 (CN) .................. 2009 2 0315922 U

(51) Int. Cl.
*H05K 7/20* (2006.01)
*F28F 7/00* (2006.01)
*H05K 5/00* (2006.01)
*A47B 77/08* (2006.01)

(52) U.S. Cl. ............... 361/679.47; 361/679.48; 361/697; 361/679.51; 165/80.3; 257/721; 174/16.1; 454/184; 312/236

(58) Field of Classification Search ............... 361/697, 361/703, 679.48–679.51, 679.47; 165/80.2–80.3; 257/712–713, 721–722; 174/15.1, 16.1, 174/16.3, 547; 454/184; 312/236
See application file for complete search history.

(56) References Cited

U.S. PATENT DOCUMENTS

| | | | | | |
|---|---|---|---|---|---|
| 5,208,734 | A | * | 5/1993 | Someno | 361/706 |
| 5,860,291 | A | * | 1/1999 | Johnson et al. | 62/259.2 |
| 5,941,617 | A | * | 8/1999 | Crane et al. | 312/204 |
| 6,967,837 | B2 | * | 11/2005 | Shih | 361/679.48 |
| 7,431,409 | B2 | * | 10/2008 | Yang | 312/265.5 |
| 2003/0016494 | A1 | * | 1/2003 | Chen | 361/687 |
| 2005/0213293 | A1 | * | 9/2005 | Chen | 361/683 |
| 2009/0057524 | A1 | * | 3/2009 | Chen | 248/638 |
| 2009/0180251 | A1 | * | 7/2009 | Biagini et al. | 361/690 |
| 2011/0122564 | A1 | * | 5/2011 | Hsieh et al. | 361/679.32 |
| 2011/0122566 | A1 | * | 5/2011 | Hsieh et al. | 361/679.33 |
| 2011/0122576 | A1 | * | 5/2011 | Kuo et al. | 361/679.58 |

* cited by examiner

*Primary Examiner* — Zachary M Pape
(74) *Attorney, Agent, or Firm* — Altis Law Group, Inc.

(57) ABSTRACT

A computer includes an enclosure, at least one disk drive, a panel and a fan. The at least one disk drive is located in the enclosure. The panel is mounted to a side of the enclosure. The panel has different material relative to the enclosure. The fan is mounted to the panel. The vibration generated from fan is indirectly transferred to the at least one disk drive.

17 Claims, 6 Drawing Sheets

COMPUTER INCLUDING A DISK DRIVE, MOTHERBOARD AND FAN

CROSS-REFERENCE TO RELATED APPLICATION

This application is related to co-pending U.S. Patent Application entitled "COMPUTER", application Ser. No. 12/695,715; co-pending U.S. Patent Application entitled "COMPUTER", application Ser. No. 12/695,707; and co-pending U.S. Patent Application entitled "COMPUTER", application Ser. No. 12/695,717.

BACKGROUND

The present disclosure relates to computers, especially to small form factor computers.

DESCRIPTION OF RELATED ART

Small form factor (SFF) computers are smaller than typical desktop computers. They are often used in space-limited areas where normal computers cannot be placed. Some SFF computers employ compact components design relative to the full-size desktop computers, such as compact optical drives, compact memory modules, and compact processors. The small size of SFF cases may limit expansion options, and standard CPU cooling system typically will not fit inside the SFF computer.

Conventional SFF PC includes a disk drive and a fan. The fan and the disk drive are usually mounted to one bracket or contact to an enclosure directly. The disk drive may be affected by vibration of the fan through the enclosure.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
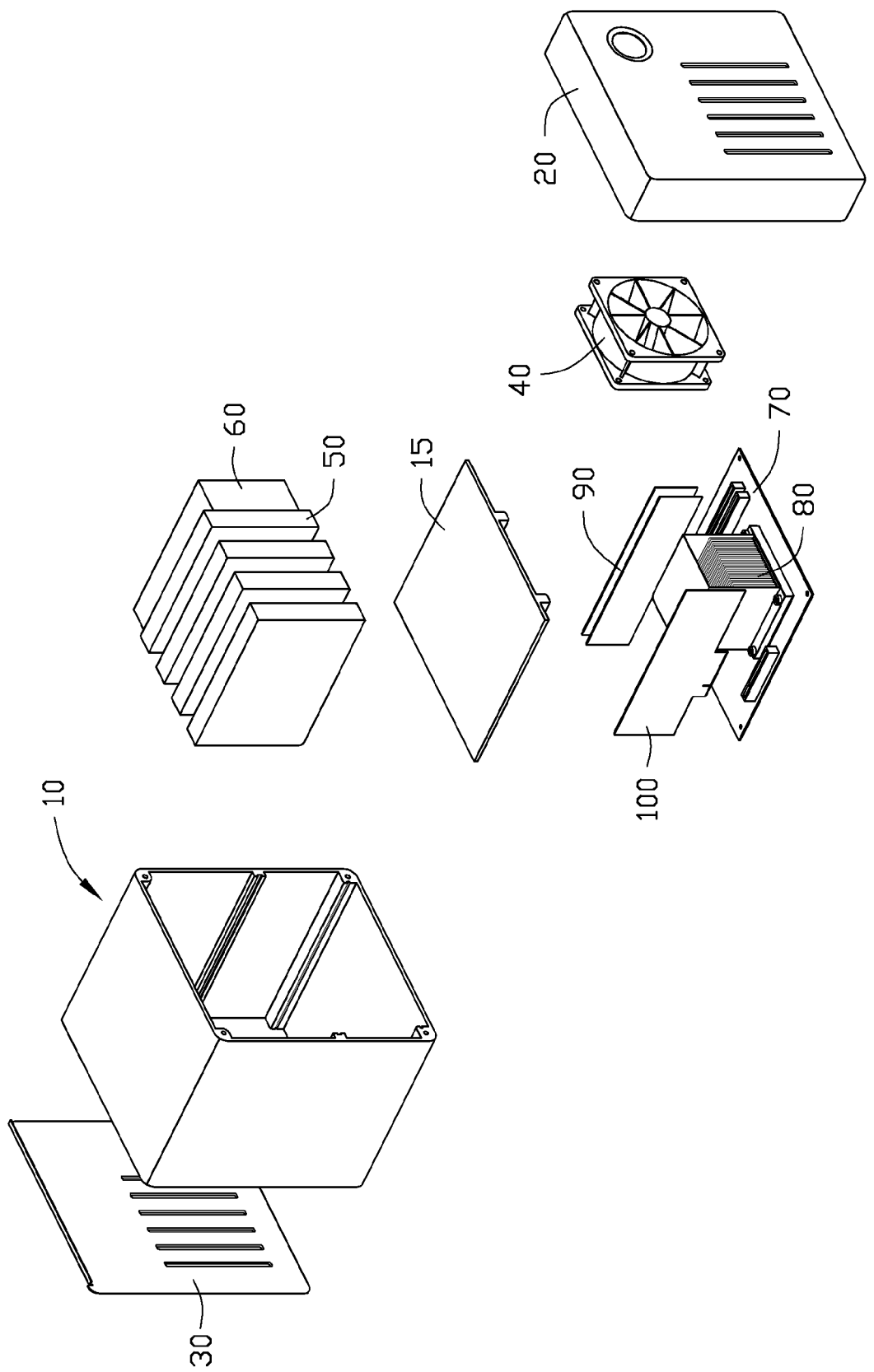
FIG. 1 is an exploded, isometric view of computer in accordance with an embodiment.

Referring to FIG. 1, a computer according an embodiment refers to a small form factor (SFF) PC. The computer includes an enclosure 10, a platform 15, a front panel 20, a back panel 30, and a plurality of hardware arranged inside the enclosure 10 and the front panel 20. The hardware may include a fan 40, a plurality of disk drives 50, a power supply 60, a motherboard 70, a heat sink 80, at least one memory 90 and at least one expansion card 100.

Figure 2:
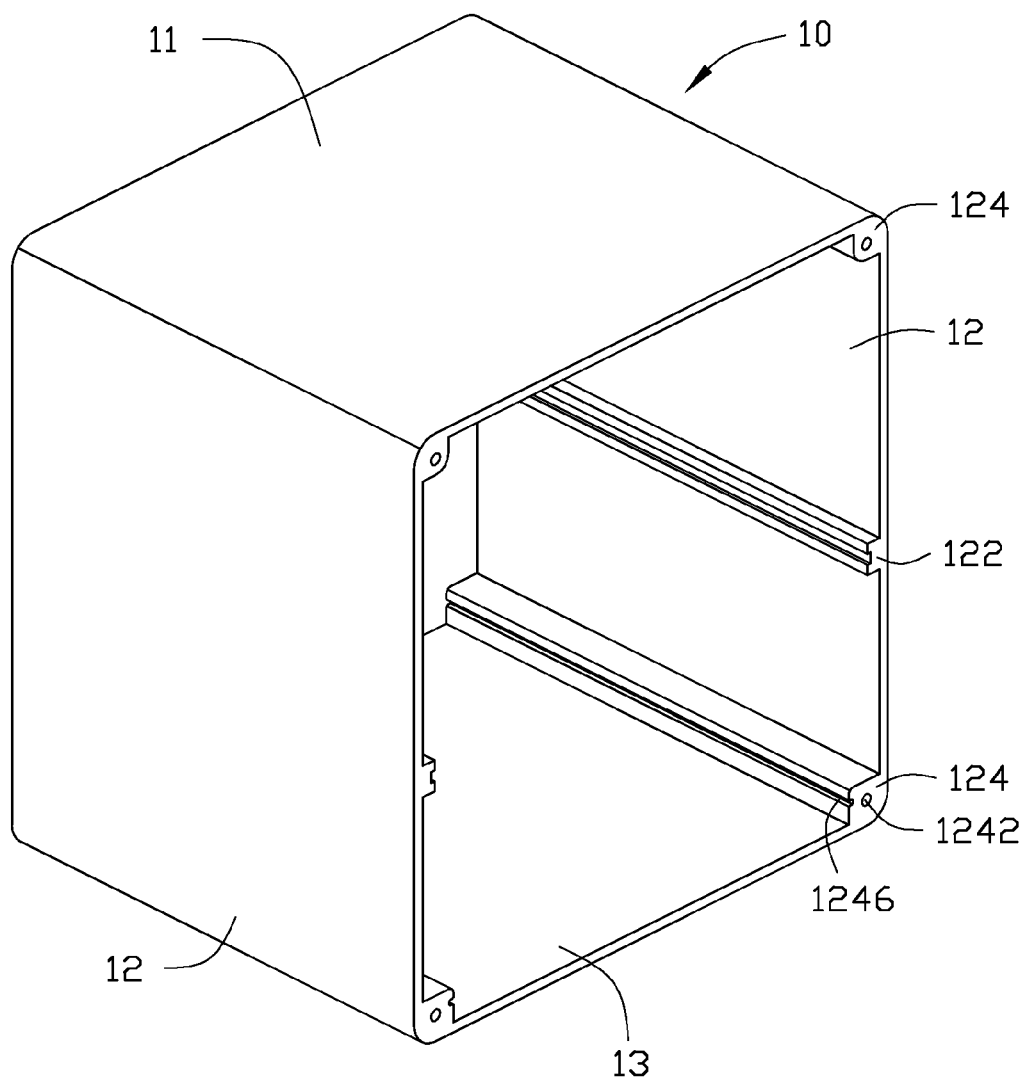
FIG. 2 is an enlarged view of an enclosure of FIG. 1.

Referring also to FIG. 2, the enclosure 10 can be integrally formed. The enclosure 10 can be made of metal, and in one embodiment, the enclosure 10 can be made of extruded aluminum. The enclosure 10 has a square cross section. The enclosure 10 defines two openings on opposite sides. The enclosure 10 includes a top wall 11, two side walls 12 and a bottom wall 13. The top wall 11, the side walls 12 and the bottom wall 13 are connected end to end, and cooperatively defining a receiving space. A first direction is defined from the back panel 30 to the front panel 20. A support portion 122 is formed on each side wall 12. The support portion 122 has a U-shaped cross section, such that it may slidingly receive the platform 15. The support portion 122 extends direction along the first direction. The extending direction is parallel to the top wall 11 of the enclosure 10. Each support portion 122 may divide the side wall 12 in the middle. A retaining portion 124 is formed at each inner corner of the enclosure 10. Each retaining portion 124 defines a retaining hole 1242 for mounting the front panel 20. Two lower retaining portions 124 define two retaining grooves 1246 for receiving the motherboard 70. The enclosure 10 may have round corners at an outer surface of each corner.

Figure 3:
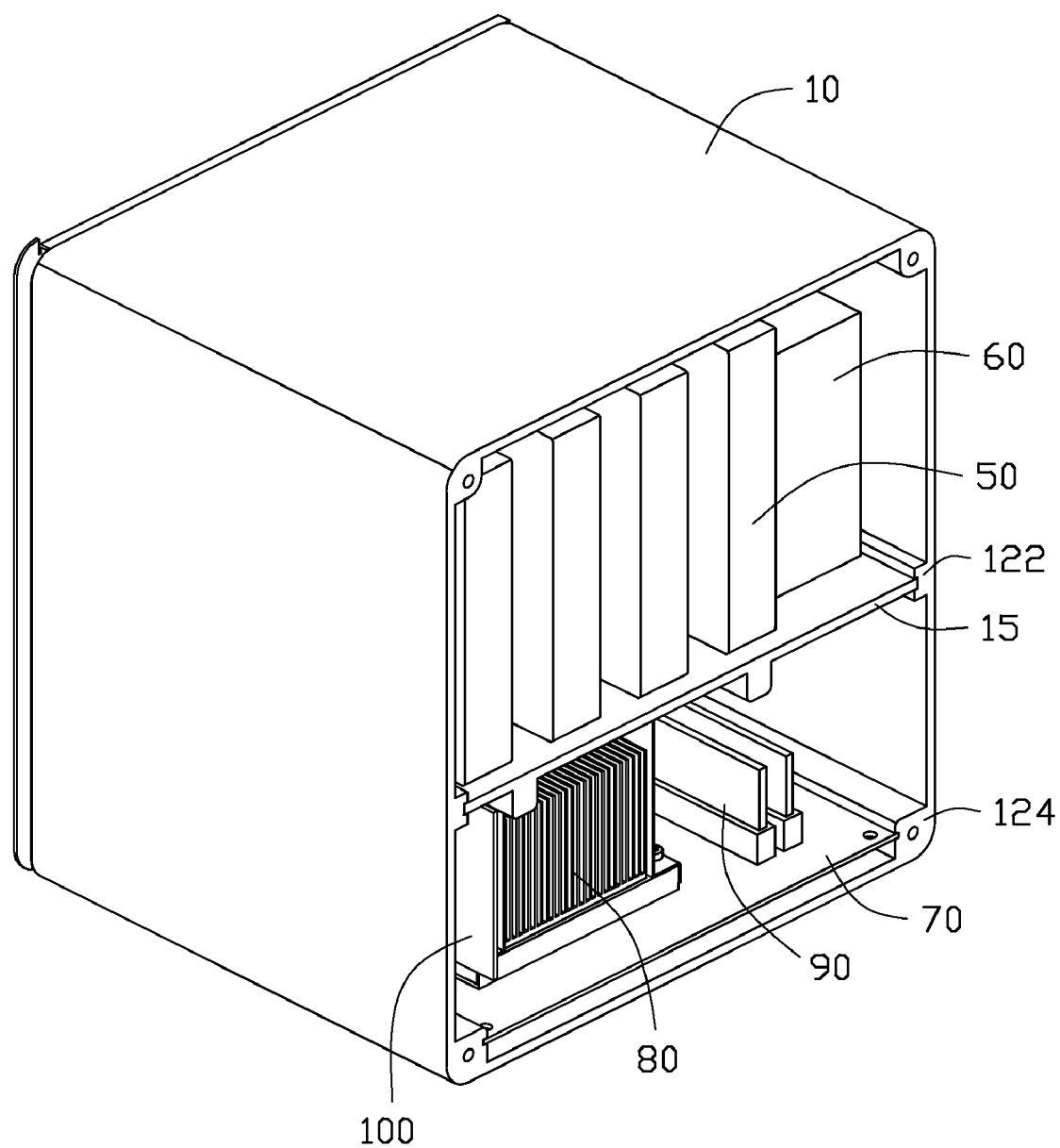
FIG. 3 is a partial assembled view of FIG. 1.

Referring to FIG. 3, the platform 15 can be made of plastic. The platform 15 divides the receiving space of the enclosure 10 into an upper housing and a lower housing when installed in the enclosure 10. The platform 15 is installed parallel to the top wall 11 and the bottom wall 13. The platform 15 may evenly partition the receiving space.

The disk drives 50 and the power supply 60 is placed in the upper housing. The disk drives 50 may be 3.5" hard disks. The platform 15 may have block tabs (not shown) to separating each disk drive 50. The height of the upper housing may be slightly taller than a height of the disk drive 50.

In some embodiments, the motherboard 70, the heat sink 80, the memory 90 and the expansion card 100 located in the lower housing. The heat sink 80, the memories 90 and the expansion card 100 are coupled to the motherboard 70. The memory 90 and the expansion card 100 parallel to the first direction for heat dissipation.

Figure 4:
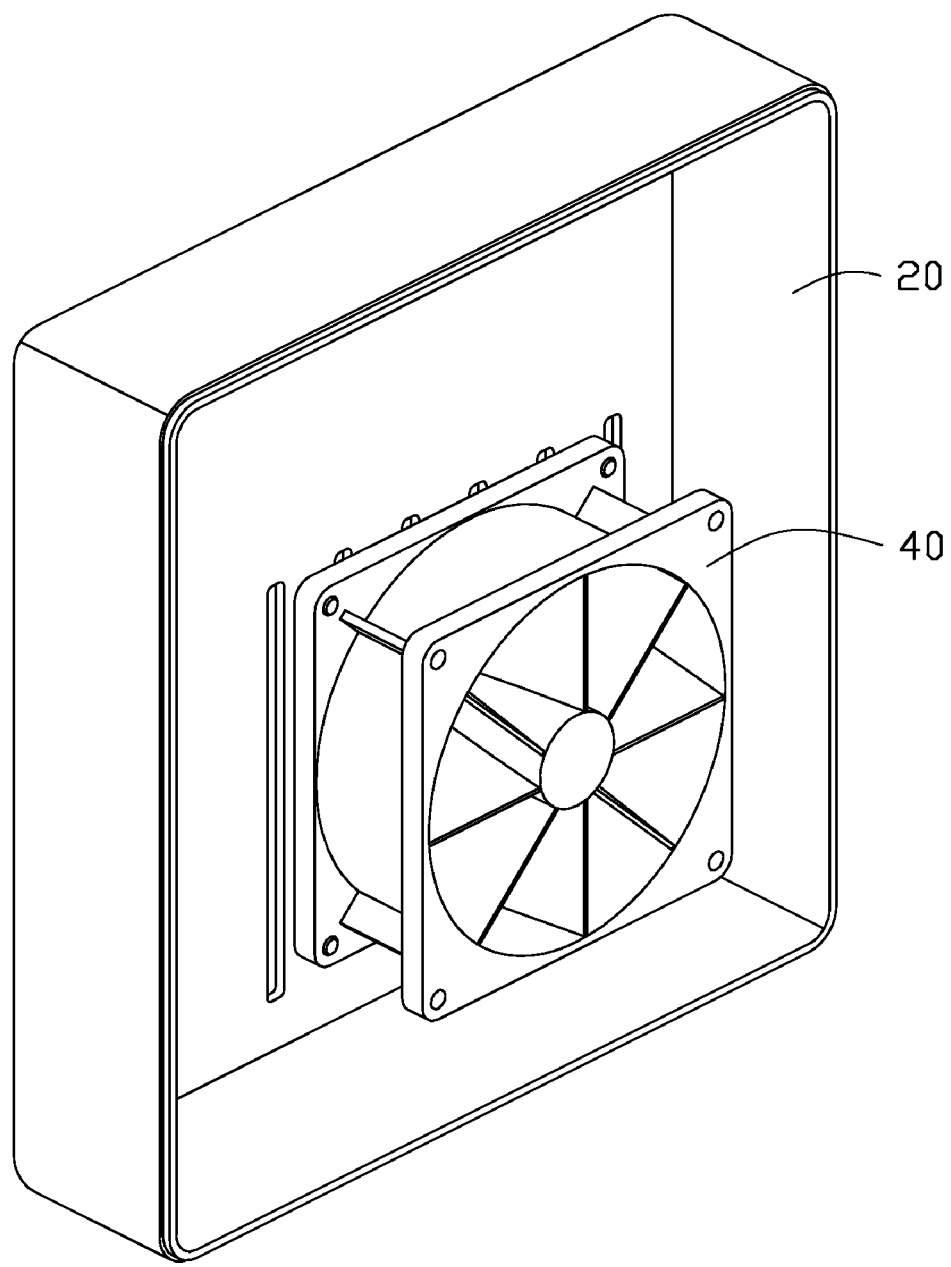
FIG. 4 is an assembled view of a fan and a front panel.
Figure 5:
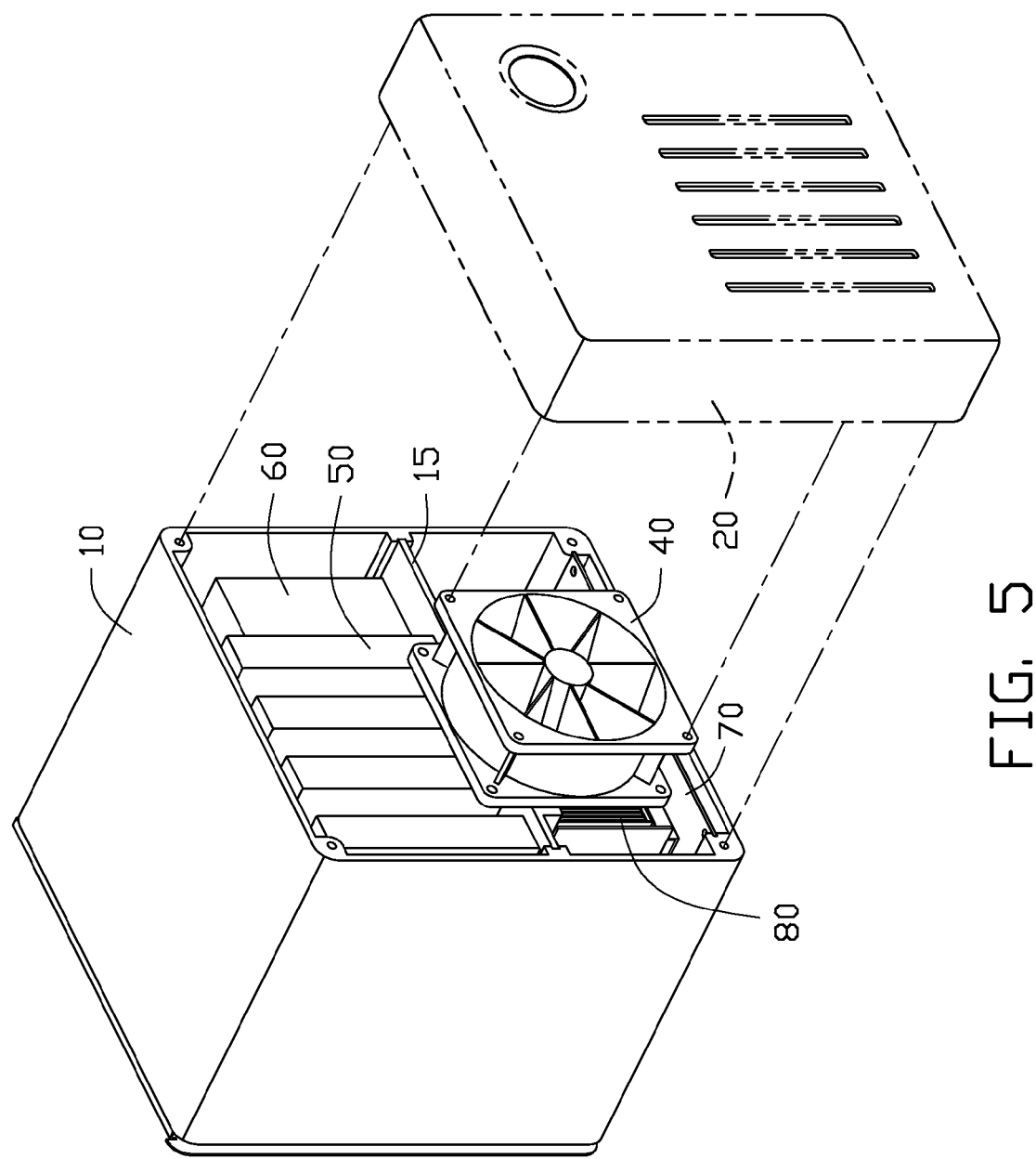
FIG. 5 is a schematic, assembled view of FIG. 1 but the front panel is removed.
Figure 6:
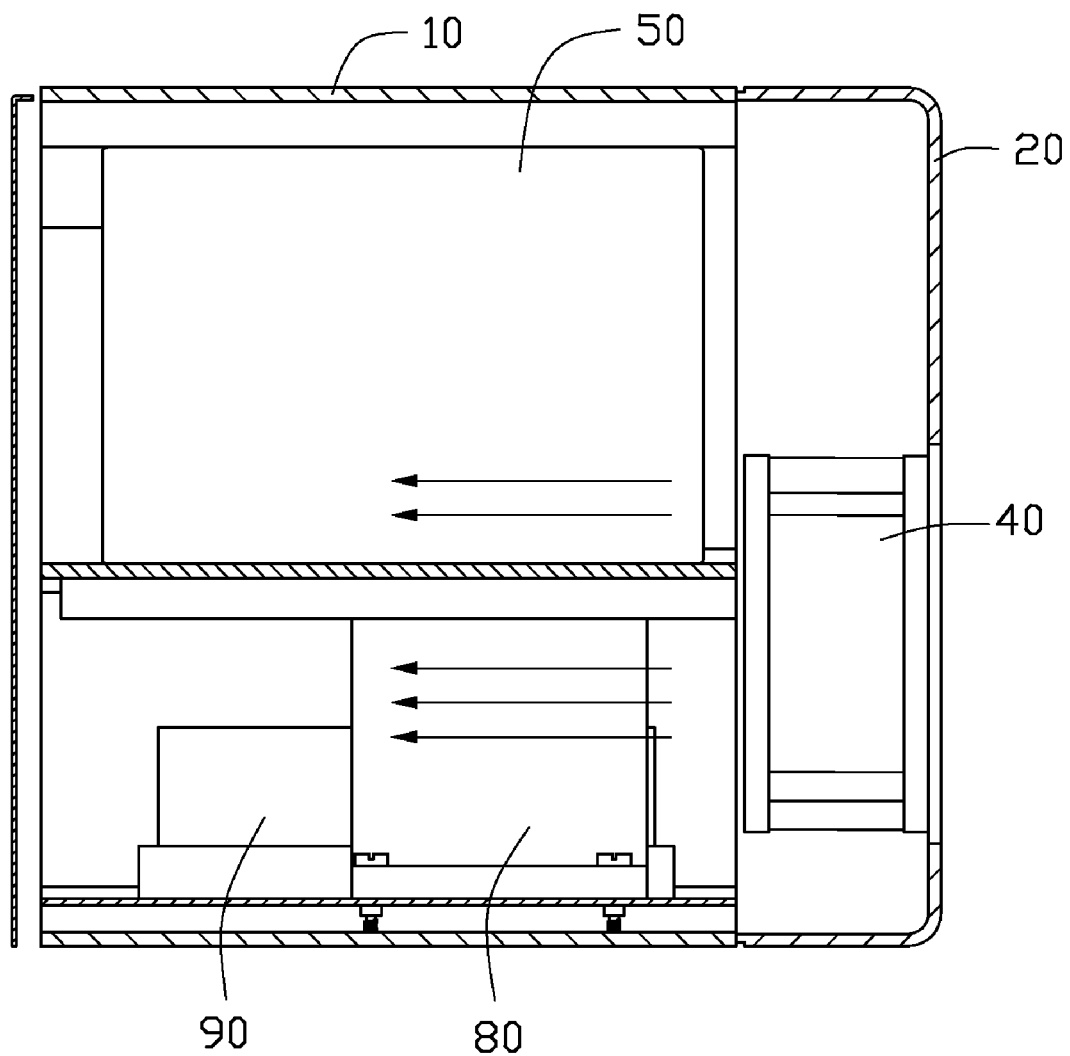
FIG. 6 is a cross-sectional view of an assembled computer, and showing airflows generated by the fan.

Referring to FIG. 4, the front panel 20 can be made from plastic. The fan 40 can be mounted to an inner surface of the front panel 20 by fasteners. An airflow area blown by the fan 40 travelling through the receiving space may be larger than 25 percent of an area of the opening of the enclosure 10.

When assembling an embodiment of the computer, the platform 15 is slid into the enclosure 10. The disk drives 50 are vertically positioned in the upper housing. A top side of each disk drive 50 may abut the top wall 11 of the enclosure 10 and aid in heat dissipation. The power supply 60 is positioned in the upper housing. The disk drives 50 and the power supply 60 can be directly located on the platform 15. The heat sink 80, the memories 90 and the expansion card 100 are mounted to the motherboard 70. The motherboard 70 is slid into the enclosure 10 via the retaining grooves 1246. The fan 40 is mounted to the front panel 20. The front panel 20 is attached to the enclosure 10 and covers one opening of the enclosure 10. The back panel 20 is screwed into the enclosure 10 to cover the other opening of the enclosure 10. The computer is assembled. The fan 40 is located at a side of the heat sink 80 and the disk drives 50. The fan 40 may leave a distance from the platform 15, the heat sink 80, and the disk drives 50.

When dissipating heat in the enclosure 10, the fan 40 can dissipate heat throughout the entire computer. The fan 40 creates an air current along the first direction. The air current may be stronger at the heat sink 80 and weaker at the disk drives 50 due to a different position of the fan 40 relative to the heat sink 80 and the disk drives 50. The air current from the front panel 20 may become warm when travelling through the heat sink 80 or disk drives 50 and the warm air current may travel out through the back panel 30. The back panel 30 may define some slots or openings of some kind to allow the warm air current to escape (see FIG. 1). In this embodiment, only a single fan 40 is used in the enclosure 10 for heat dissipation, so the air current blown by the fan 40 may travel through the receiving space along a straight direction, thus no other fans or air duct for guiding air current is needed in the enclosure 10. Therefore, reducing the number of fans and efficiently dissipating heat in the computer.

In conventional computer, a disk drive may be affected by vibrations from an external source, such as a fan, when the disk drive and the fan are mounted to a bracket. However, in the embodiment, the disk drives 50 and the fan 40 are located separately. The disk drives 50 are placed in the enclosure 10, and the fan 40 is mounted to the front panel 20. In some embodiments, the enclosure 10 is made of metal and the fan 40 is made of plastic. Vibration generated from the fan 40 is indirectly transferred to the disk drives 50. In detail, the vibration generated from the fan 40 sequentially passes through the plastic front panel 20, the metal enclosure 10 and the plastic platform 15. Connection with different material between the enclosure 10 and the fan 40 can effectively reduce vibration transfer between the enclosure 10 and the front panel 20. In another embodiment, the fan 40 can be mounted to the back panel 30 instead. In addition, a disk drive may generate vibrations that affect the electronic elements coupled on the motherboard when the disk drive is working. In the embodiment, the disk drives 50 and the motherboard 70 are separated by the plastic platform 15. Effects caused by vibrations from the disk drives 50 can be reduced.

According some embodiments, the enclosure 10 is made of single piece of aluminum. This aluminum enclosure 10 can save conventional assembling cost of enclosure and get better effect of heat dissipation.

In other embodiments, the hardware in the upper housing and the lower housing can be switched. The motherboard 70, the heat sink 80, the memories 90 and the expansion card 100 are placed in the upper housing, and the disk drives 50 and the power supply 60 are placed in the lower housing. The fan 40 is located at a side of the heat sink 80 and the disk drives 50. The upper housing and the lower housing can also be further divided as needed.

It is also to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A computer comprising: an enclosure, the enclosure having a square cross section, the enclosure comprising four retaining portions at inner corners of the enclosure; at least one disk drive located in the enclosure; a panel mounted to a side of the enclosure on the four retaining portions, the panel comprising a different material than the enclosure; and a fan mounted to the panel and spaced a distance from the at least one disk drive; wherein vibration generated from the fan is indirectly transferred to the at least one disk drive; the four retaining portions comprise a pair of lower retaining portions, and the pair of lower retaining portions define a pair of retaining grooves for receiving a motherboard.

2. The computer of claim 1, wherein the fan creates an air current along a direction perpendicular to panel.

3. The computer of claim 1, wherein the panel is a front panel.

4. The computer of claim 1, wherein the enclosure is made of metal and the panel is made of plastic.

5. The computer of claim 1 further comprising a platform, the platform divides the enclosure into two housings.

6. The computer of claim 5, wherein the at least one disk drive and the motherboard are located in different housings.

7. The computer of claim 6 further comprising a heat sink coupled to the motherboard, wherein the fan is located at a side of the heat sink and the at least one disk drive, and the fan is spaced from the platform.

8. The computer of claim 6, wherein the housings comprise an upper housing and a lower housing, the at least one disk drive is located in the upper housing, and the motherboard is located in the lower housing.

9. The computer of claim 5, wherein the at least one disk drive is mounted to the platform.

10. The computer of claim 9, wherein the enclosure is made of metal and the platform is made of plastic.

11. The computer of claim 10, wherein the panel is made of plastic.

12. The computer of claim 11, wherein the enclosure is made of extruded aluminum.

13. The computer of claim 5, wherein the two housings, divided by the platform, are substantially equal.

14. The computer of claim 1, wherein the enclosure comprises a top wall, a bottom wall parallel to the top wall and two side walls.

15. The computer of claim 14, wherein the top wall, the bottom wall and the two side walls are made of a single piece.

16. The computer of claim 1, wherein each of the four retaining portions defines a retaining hole for mounting the front panel.

17. The computer of claim 16, wherein the enclosure has rounded corners at an outer surface.

* * * * *